(12) United States Patent
Ludwig

(10) Patent No.: US 10,017,019 B1
(45) Date of Patent: Jul. 10, 2018

(54) JACK LOCK

(71) Applicant: Duane L. Ludwig, Paynesville, MN (US)

(72) Inventor: Duane L. Ludwig, Paynesville, MN (US)

( * ) Notice: Subject to any disclaimer, the term of this patent is extended or adjusted under 35 U.S.C. 154(b) by 124 days.

(21) Appl. No.: 15/289,902

(22) Filed: Oct. 10, 2016

Related U.S. Application Data

(60) Provisional application No. 62/239,800, filed on Oct. 9, 2015.

(51) Int. Cl.
| | |
|---|---|
| *B60D 1/60* | (2006.01) |
| *B62D 63/08* | (2006.01) |
| *B60D 1/66* | (2006.01) |
| *E02F 9/08* | (2006.01) |
| *B60R 25/09* | (2013.01) |
| *B60D 1/06* | (2006.01) |
| *B60S 9/04* | (2006.01) |
| *B60S 9/02* | (2006.01) |

(52) U.S. Cl.
CPC ............. *B60D 1/60* (2013.01); *B60D 1/605* (2013.01); *B60D 1/66* (2013.01); *B60R 25/093* (2013.01); *B62D 63/08* (2013.01); *E02F 9/085* (2013.01); *B60D 1/06* (2013.01); *B60S 9/02* (2013.01); *B60S 9/04* (2013.01)

(58) Field of Classification Search
CPC . B60D 1/60; B60D 1/605; B60D 1/66; B60D 1/06; B62D 63/08; B60R 25/093; E02F 9/085; B60S 9/02; B60S 9/04
See application file for complete search history.

(56) References Cited

U.S. PATENT DOCUMENTS

| | | |
|---|---|---|
| 1,251,591 A | 1/1918 | Stoddart |
| 1,831,513 A | 11/1931 | Sitz et al. |
| 3,605,457 A | 9/1971 | Foster |
| 4,548,418 A | 10/1985 | Wendorff |
| 4,571,964 A | 2/1986 | Bratzler |
| 4,620,718 A | 11/1986 | Mickelson |
| 4,774,823 A | 10/1988 | Callison |
| 5,018,759 A | 5/1991 | Villalon et al. |
| 5,094,423 A | 3/1992 | Almquist et al. |
| 5,351,511 A | 10/1994 | Bernier |
| 5,421,601 A * | 6/1995 | Hinze ............... B60D 1/60 280/507 |

(Continued)

*Primary Examiner* — Kevin Hurley
*Assistant Examiner* — Marlon A Arce
(74) *Attorney, Agent, or Firm* — Albert W. Watkins

(57) ABSTRACT

A jack lock has a hinged jack enclosure that encompasses a trailer jack. In a first restraining position the jack enclosure prevents a trailer jack from retracting to an transport position. In a second releasing position the jack lock may be easily and quickly removed from the jack. To further deter theft, a tongue arm is unitarily fabricated with and extends from the jack enclosure. The tongue arm runs under a trailer ball receiver, and terminates with a hitch stop that wraps around the ball receiver to block a land vehicle from accessing the trailer coupler. A lock selectively holds the jack enclosure closed to prevent the trailer jack from retracting, but when unlocked permits the jack enclosure to be removed from the trailer jack. Removal of the jack enclosure will also remove the hitch stop from blocking the ball receiver. A lock enclosure prevents access to the locking mechanisms.

20 Claims, 4 Drawing Sheets

(56) References Cited

U.S. PATENT DOCUMENTS

| | | | |
|---|---|---|---|
| 5,544,505 | A | 8/1996 | McIntosh et al. |
| 5,775,139 | A | 7/1998 | Sellers |
| 6,019,337 | A | 2/2000 | Brown |
| 6,070,441 | A | 6/2000 | Bernstrom |
| 6,405,570 | B1 | 6/2002 | Middleton et al. |
| 6,406,052 | B1 | 6/2002 | Bale |
| 6,412,313 | B1 | 7/2002 | Bernstrom |
| 6,434,982 | B1 | 8/2002 | Rowland |
| 6,520,067 | B1 | 2/2003 | Hunt et al. |
| 6,874,338 | B1 | 4/2005 | Hunt et al. |
| 7,246,810 | B2 | 7/2007 | Bussiere et al. |
| 7,337,636 | B2 | 3/2008 | Witchey |
| 7,584,677 | B1 * | 9/2009 | Johnson ............... B60D 1/66 254/424 |
| 7,631,523 | B1 | 12/2009 | Sosa |
| 7,635,143 | B2 | 12/2009 | Pappalardo |
| 8,783,660 | B1 * | 7/2014 | Riddle ............... B60S 11/00 254/418 |
| 9,033,358 | B1 * | 5/2015 | Williamson ......... B60D 1/06 280/507 |
| 2003/0019260 | A1 * | 1/2003 | Smith ............... B60R 25/001 70/235 |

* cited by examiner

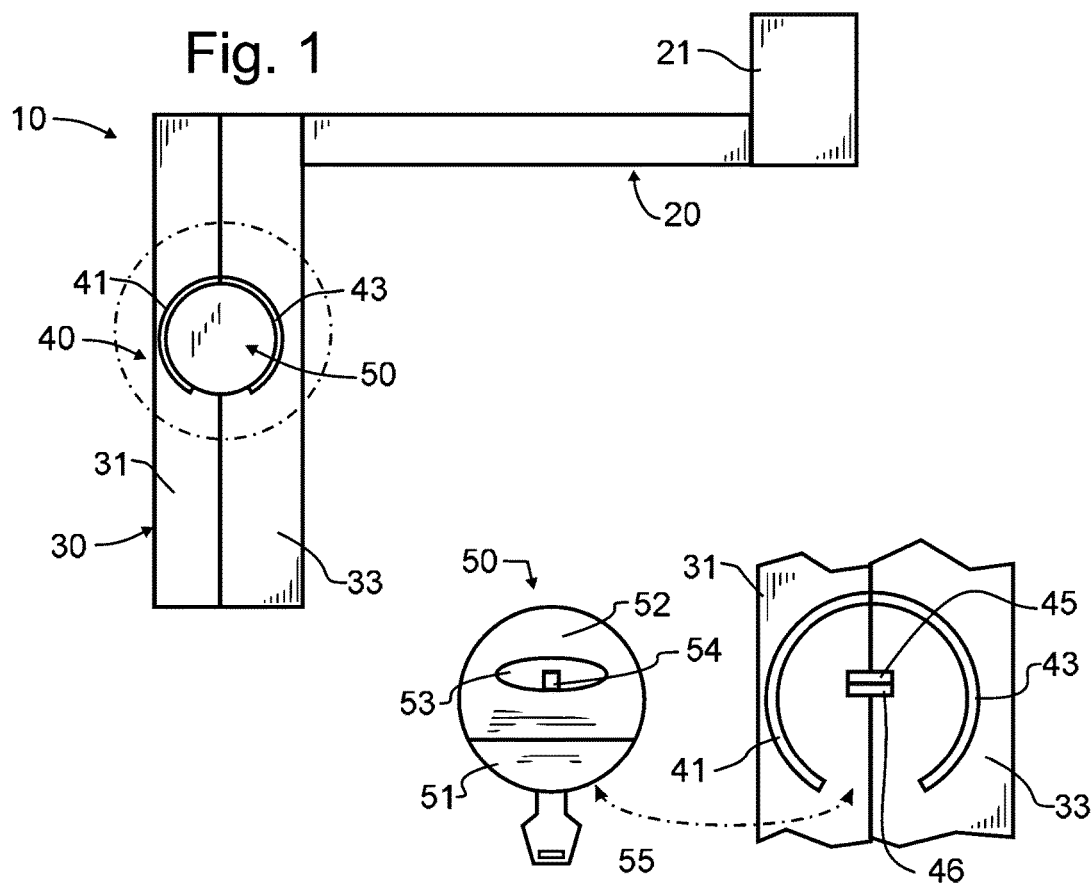
Fig. 1
Fig. 2
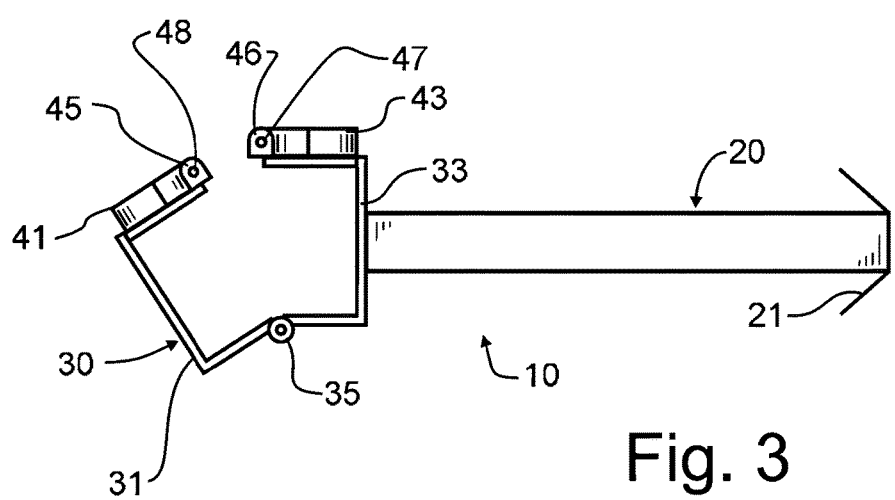
Fig. 3

JACK LOCK

CROSS REFERENCE TO RELATED APPLICATIONS

The present application claims the benefit of U.S. provisional patent application 62/239,800 filed Oct. 9, 2015 of like title and inventorship, the teachings and entire contents which are incorporated herein by reference.

BACKGROUND OF THE INVENTION

1. Field of the Invention

The present invention pertains generally to a locking theft deterrent, and more particularly to an apparatus adapted to secure a trailer jack in an extended position in order to deter the theft of a trailer.

2. Description of the Related Art

Land vehicles such as automobiles, pick-up trucks, and Sport Utility Vehicles (SUVs) are ubiquitous. Nearly every household owns and relies upon at least one such vehicle for efficient transportation. Many of these vehicles, such as pick-up trucks and SUVs, are designed to carry significant cargo. Nevertheless, there are reasonable limits to the size of the vehicle, and therefore the cargo that the vehicle may carry. Furthermore, placing larger cargo within enclosed vehicles, while avoiding scuffing and scraping the vehicle and cargo, can be difficult.

The determination of what size vehicle is reasonable often will include considerations such as available sheltered parking space, the ability to park easily and efficiently at various destination points, purchase price of the vehicle, and cost to operate the vehicle per mile of transport. Each of the foregoing factors encourage a smaller vehicle, while the flexibility to carry diverse and larger cargo and payloads encourage a larger vehicle. Consequently, every vehicle buyer must elect a suitable vehicle size for their intended uses.

As a result of the necessary trade-offs, most commercially manufactured vehicles have very little cargo space. Even a full size pick-up truck with a small cab may only have a bed for cargo that is approximately 8 feet long, 6 feet wide, and a few feet high. While this cargo space is much larger than available in a typical car, there are many times where this space will still be insufficient or undesirable to use.

For longer than there have been automobiles, there have been trailers. A trailer will be understood herein to be a land vehicle that is drawn by a separable motive power source, such as but not limited to a car or pick-up truck. The purpose of the trailer is to allow cargo to be carried within the trailer, while permitting the trailer to be separable from the vehicle. Consequently, when cargo not well suited for transport by a powered vehicle such as a pick-up truck needs to be hauled, the trailer can be used to carry the cargo, and the vehicle can be used to tow the trailer. An added benefit of many trailers is that the trailer is often fully enclosed, and void of windows. Consequently, the contents of the trailer are not as readily ascertained as they would be through the windows of a passenger vehicle, and access is somewhat more difficult than simply breaking the window, making the contents within a trailer less of an attractive nuisance to potential thieves. As a result of the much greater flexibility offered by using a separable trailer and the ability to fully enclose the contents without windows, trailers have also become very common in many households and businesses. Watercraft, All-Terrain Vehicles (ATVs), snowmobiles, bicycles, over-size lumber and other building materials, and many other types of cargo are commonly transported within a trailer. Tools and supplies used in a trade such as construction, plumbing, electrical work and other trades also are commonly transported in trailers. As may be readily apparent, the trailer can be quite useful.

A good trailer can also be quite expensive. This is particularly true for enclosed trailers, such as those used by businesses to store tools and supplies. In many cases, not only is the trailer expensive, but the contents of the trailer can be substantially more valuable. Unfortunately, this also means that the trailer is more attractive to thieves.

A typical trailer has some type of trailer coupler that hitches in an articulating manner to the towing vehicle. Commonly, this is may be a trailer coupler that encompasses a ball extending from a draw bar coupled to the towing vehicle. Most trailers also have an apparatus for securing the trailer coupler to the ball, such as a lock that prevents the trailer coupler from releasing from the ball. This securement is important for safety during transport, so that the trailer cannot accidentally separate from the vehicle. The securement also serves as an excellent way to prevent a thief from separating the trailer from the vehicle when parked.

Unfortunately, when the vehicle is intentionally separated from the trailer, the trailer is much more susceptible to theft. Even if the locking hitch is secured in a closed position, the thief may use tape or other fastener to bind the inoperable trailer coupler to the thief's vehicle. Additionally, the lock is exposed, meaning the thief has excellent access to force the lock open or cut the lock or the locking component of the hitch. In summary, the trailer is undesirably vulnerable to theft when parked separate from the towing vehicle. As a result, there is much need for a better way to secure a trailer against theft.

A number of creative and skilled artisans have devised apparatus to secure the ball in such a way as to prevent access by a potential thief. Exemplary U.S. patents, the teachings which are incorporated herein by reference, include: U.S. Pat. No. 3,605,457 by Foster, entitled "Trailer hitch lock"; U.S. Pat. No. 4,571,964 by Bratzler, entitled "Trailer hitch lock"; U.S. Pat. No. 4,620,718 by Mickelson, entitled "Kingpin lock"; U.S. Pat. No. 4,774,823 by Callison, entitled "Trailer hitch lock"; U.S. Pat. No. 5,018,759 by Villalon et al, entitled "Tamper resistant trailer hitch"; U.S. Pat. No. 5,351,511 by Bernier, entitled "Trailer kingpin locking device"; U.S. Pat. No. 5,775,139 by Sellers, entitled "Trailer hitch lock"; U.S. Pat. No. 6,070,441 by Bernstrom, entitled "Trailer hitch security device"; U.S. Pat. No. 6,412,313 by Bernstrom, entitled "Trailer security device"; and U.S. Pat. No. 7,246,810 by Bussiere et al, entitled "Hitch locking module"; U.S. Pat. No. 7,635,143 by Pappalardo, entitled "System and method for protecting a trailer coupler". While these devices make securing the trailer to a towing vehicle more difficult, they nevertheless still permit a thief to use stronger tape such as packaging or glass-threaded tape or a cable in combination with tape to wrap about the locked receiver hitch. While the thief may not be able to travel long distances with such a securement, they may nevertheless be able to move the trailer sufficiently far to then use more extreme measures to remove either the locking device or replace the receiver.

Recognizing this limitation, other artisans have devised ball receiver locks with integral stands. These apparatus secure to the receiver and extend to the ground, meaning the would-be thief must somehow remove the stand in order to move the trailer. Exemplary U.S. patents, the teachings which are incorporated herein by reference, include: U.S. Pat. No. 6,406,052 by Bale, entitled "Secure trailer hitching post"; U.S. Pat. No. 5,094,423 by Almquist et al, entitled "Trailer security device and method"; U.S. Pat. No. 4,548,418 by Wendorff, entitled "Trailer support stand"; and U.S. Pat. No. 6,019,337 by Brown, entitled "Lockable stand for trailers". While these devices prevent the would-be thief from quickly wrapping the receiver in tape and then driving off to a more isolated location, and therefore can be a greater deterrent than the receiver locks, they suffer from several additional drawbacks. The Almquist et al apparatus requires more work to secure the trailer, and must be in a place where the ground may be pierced, making the apparatus useless for use when the trailer is parked in a paved parking lot. All of these apparatus also rely entirely upon the ball receiver to secure the trailer. Unfortunately, and as clearly illustrated in Almquist et al and Wendorff, most ball receivers are simply bolted to the trailer tongue. This means that a thief must merely remove the bolts affixing the ball receiver to the tongue, and then tape the tongue to their towing vehicle. While some have proposed more permanently affixing the receiver to the tongue, which would make theft much more difficult, the reason the receive is normally bolted in place is specifically to permit repair and replacement when needed. Consequently, a trailer owner must weigh the benefits of a removable ball receiver against the risk of theft, and is therefore forced to make undesirable trade-offs.

There are additional known techniques of securing wheeled vehicles, such as devices that lock a wheel against rotation. Unfortunately, such devices present a safety hazard to the trailer owner as well. This is because of the chance that the trailer owner may forget that the device is attached. In such case, the safety device may cause serious and unintentional damage to the trailer. Consequently, trailer theft deterrent devices that operate on the ball receiver hitch have an important advantage over other theft deterrent devices, since the chance of forgetting about the device and doing damage to the trailer is greatly reduced.

In an unrelated and therefore non-analogous art, artisans have proposed ways to lock heavy equipment and prevent or reduce the likelihood of theft. Exemplary U.S. patents, the teachings which are incorporated herein by reference, include: U.S. Pat. No. 1,251,591 by Stoddart, entitled " "; U.S. Pat. No. 6,405,570 by Middleton et al, entitled "Anti-theft device"; U.S. Pat. No. 6,520,067 by Hunt et al, entitled "Hydraulic piston locking device"; U.S. Pat. No. 6,874,338 by Hunt et al, entitled "Hydraulic piston locking device"; and U.S. Pat. No. 7,337,636 by Witchey, entitled "Anti-theft device". Each of these devices operate by securing a moveable member in an extended configuration. In the case of the Stoddart patent, the clutch pedal of an automobile is prevented from being depressed. The other patents each secure a vital hydraulic cylinder such as a bucket cylinder in an extended configuration that interferes with movement of the vehicle. These apparatus serve their intended functions well, but there is no teaching of how such apparatus might be applied to a trailer, nor how further benefits could be obtained therewith.

Additional patents of varying relevance, the relevant teachings and contents which are incorporated herein by reference, include: U.S. Pat. No. 1,831,513 by Sitz et al, entitled "Safety clamp retaining device"; U.S. Pat. No. 5,544,505 by McIntosh et al, entitled "Lock bracket"; U.S. Pat. No. 6,434,982 by Rowland, entitled "Lock for tractor trailer landing gear"; and U.S. Pat. No. 7,631,523 by Sosa, entitled "Trailer-mounted forklift lock".

As may be apparent, in spite of the enormous advancements and substantial research and development that has been conducted, there still remains a need for a more effective means of preventing the theft of an uncoupled and parked trailer.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a trailer and jack lock. The trailer comprises a trailer body configured to transport cargo; a trailer coupler adapted to couple to a land vehicle; a tongue secured on a first end to the trailer coupler and on a second end distal to the first end to the trailer body; and a jack having a retractable base. The jack lock comprises a jack enclosure selectively configured in a first restraining position to prevent the jack retractable base from retracting to an inoperative position, and in a second releasing position to permit the jack lock to be removed from the jack; a tongue arm secured on a first end with the jack enclosure; a hitch stop secured on a second end of the tongue arm distal to the jack enclosure and configured to block the land vehicle from accessing the trailer coupler when the jack enclosure is in the first restraining position; and a lock selectively configured in a first locked position to hold the jack enclosure in the first restraining position and in a second unlocked position to permit the jack enclosure to be moved from the first restraining position to the second releasing position.

In a second manifestation, the invention is a jack lock configured to lock a trailer coupler and trailer jack and thereby deter theft of a trailer. A jack enclosure has a first jack enclosure portion, a second jack enclosure portion, and a hinge coupling the first jack enclosure portion to the second jack enclosure portion. The hinge is adapted in a first restraining position to allow the first jack enclosure portion and second jack enclosure portions to abut each other, and define a generally tubular geometry that prevents a jack retractable base from retracting to an inoperative position. The hinge is adapted in a second releasing position to allow the first and second jack enclosure portions to spread apart from each other and define a generally open clamshell geometry selectively configured to permit the jack lock to be removed from the trailer jack. A tongue arm is secured on a first end with the jack enclosure and extends longitudinally therefrom in a direction generally transverse to a longitudinal axis of the jack enclosure. A hitch stop is secured on a second end of the tongue arm distal to the jack enclosure and is configured to block a land vehicle from accessing the trailer coupler when the jack enclosure is in the first restraining position. A lock is selectively configured in a first locked position to hold the jack enclosure in the first restraining position and in a second unlocked position to permit the jack enclosure to be moved from the first restraining position to the second releasing position.

In a third manifestation, the invention is a jack lock. The jack lock has a jack enclosure having a first jack enclosure portion, a second jack enclosure portion, and a hinge coupling the first jack enclosure portion to the second jack enclosure portion. The hinge is adapted in a first restraining position to allow the first jack enclosure portion and the second jack enclosure portion to abut each other and define a generally tubular geometry that is configured to prevent a jack retractable base from retracting to an inoperative position. The hinge is adapted in a second releasing position to allow the first jack enclosure portion and the second jack enclosure portion to spread apart and define a generally open clamshell geometry selectively configured to permit the jack lock to be removed from a trailer jack. A tongue arm is secured on a first end with the jack enclosure and extends longitudinally therefrom in a direction generally transverse to a longitudinal axis of the jack enclosure. The tongue arm length is comparable to the jack enclosure length and the tongue arm is thereby adapted to engage with a ground surface if the jack lock is rotated about a horizontal axis. A hitch stop is secured on and extends vertically from a second end of the tongue arm distal to the jack enclosure. The hitch stop has a first face transverse to the tongue arm, and second and third faces angled with respect to first face and at least partially wrapping toward the jack enclosure. The hitch stop is thereby configured to block a land vehicle from accessing a trailer coupler when the jack enclosure is in the first restraining position. A lock is selectively configured in a first locked position to hold the jack enclosure in the first restraining position and in a second unlocked position to permit the jack enclosure to be moved from the first restraining position to the second releasing position. A lock enclosure has a first lock enclosure portion affixed to the first jack enclosure portion, and a second lock enclosure portion affixed to the second jack enclosure portion and pivotal therewith about the hinge with respect to the first lock enclosure and the first jack enclosure. The lock enclosure protrudes generally transversely from the jack enclosure and is configured to limit access to the lock when the lock is in the first locked position.

OBJECTS OF THE INVENTION

Exemplary embodiments of the present invention solve inadequacies of the prior art by combining in a single apparatus a hitch lock and a jack lock. A tongue arm and hitch stop disable a trailer coupler. Unitarily fabricated with the hitch stop is a hinged jack enclosure that encloses an extended jack stand and prevents a would-be thief from retracting the jack stand. A lock enclosure is also provided, to prevent the would-be thief from accessing the locking mechanisms.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a trailer lock that both intuitive and quick and easy to install and remove, while also being more resistant to theft than heretofore available. A second object of the invention is to ensure theft deterrence while not poising an increased risk of accidental damage to the trailer. Another object of the present invention is to provide a locking apparatus that is secured to and blocks the ball receiver and simultaneously extends about and prevents retraction of the trailer jack, and thereby ensures that the trailer jack stays in contact with the ground and interferes with movement of the trailer. A further object of the invention is to provide a jack lock that may be used effectively on any surface, including but not limited to paved and earthen surfaces. Yet another object of the present invention is to secure a factory-provided removable ball receiver without necessitating permanent coupling of the ball receiver to the trailer tongue. An additional object of the invention is to enclose the locking components from external access when locked.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 1 illustrates a preferred embodiment jack lock designed in accord with the teachings of the present invention from side elevational view.

FIG. 2 illustrates a preferred locking mechanism used in the preferred embodiment jack lock of FIG. 1 from an enlarged and exploded partial side elevational view, with the puck lock separated from complementary lock holes.

FIG. 3 illustrates the preferred embodiment jack lock of FIG. 1 from a bottom view, and with the puck lock completely removed therefrom.

a preferred embodiment Jack Lock designed in accord with the teachings of the present invention from a top plan view.

Figure 5:
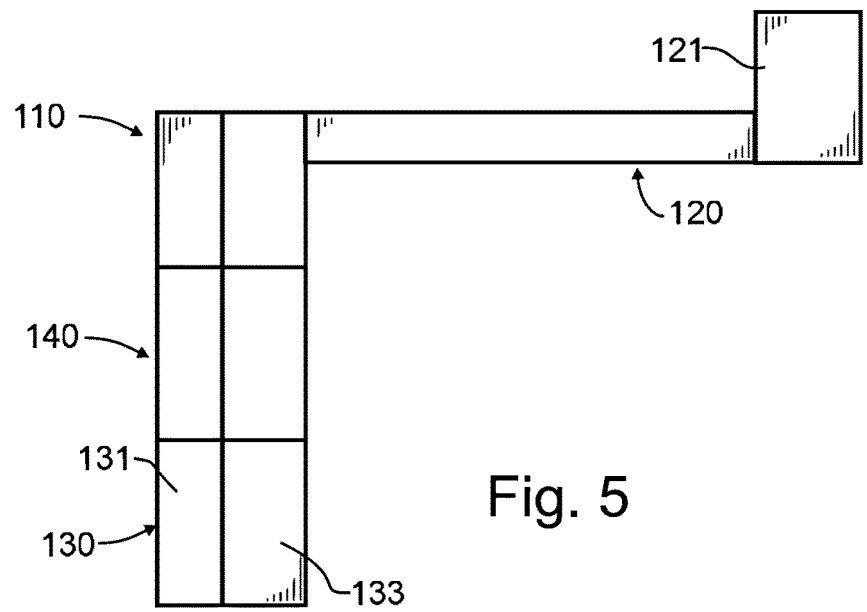
Figure 6:
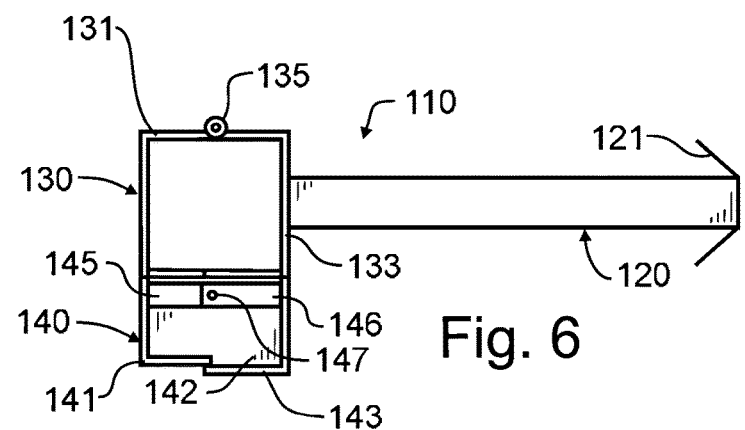

FIGS. 5 and 6 illustrate a first alternative embodiment jack lock designed in accord with the teachings of the present invention from side elevational and bottom views, respectively.

Figure 7:
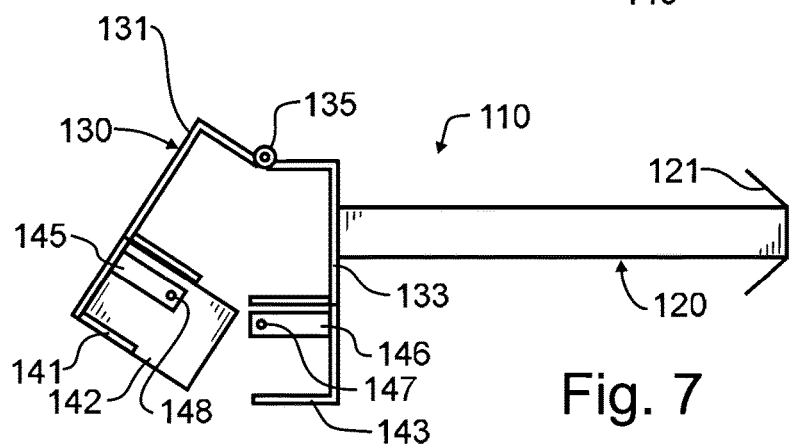

FIG. 7 illustrates the first alternative embodiment jack lock from bottom view and in an open and inactive position used for installation.

Figure 8:
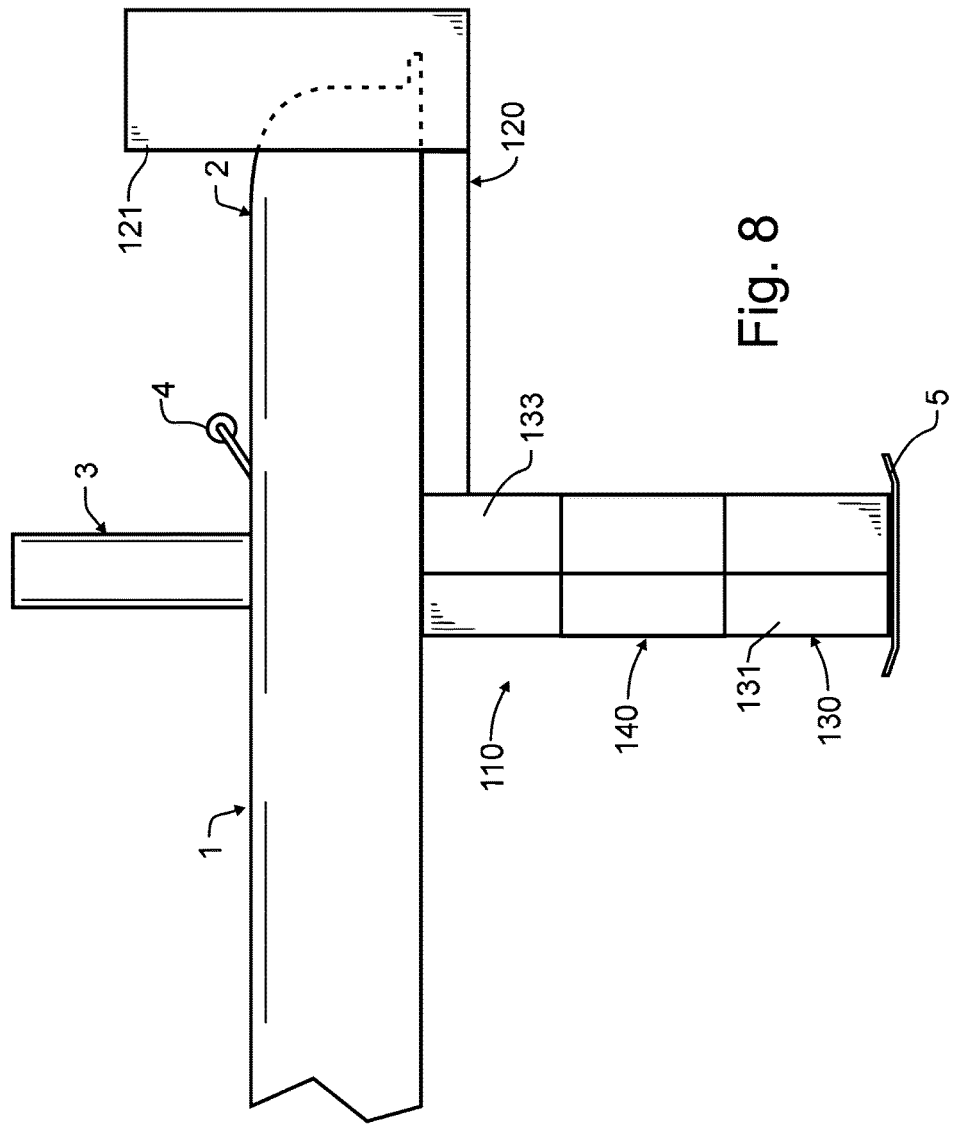

FIG. 8 illustrates the first alternative embodiment jack lock in combination with a trailer tongue, trailer coupler, and jack in an active position.

DESCRIPTION OF THE PREFERRED EMBODIMENT

In a preferred embodiment of the invention illustrated in FIGS. 1-3, a jack lock 10 is comprised of a tongue arm 20, a jack enclosure 30, and a lock enclosure 40. Preferred embodiment jack lock 10 may be manufactured from a variety of materials, including metals, resins and plastics, ceramics or cementitious materials, or even combinations, laminates, or composites of the above. The specific material used may vary, though special benefits are attainable if several important factors are taken into consideration. First, preferred embodiment jack lock 10 will preferably be sufficiently tough and durable to not fracture or cut, even when great forces are applied thereto. In addition, preferred embodiment jack lock 10 will also be stain and corrosion resistant, to withstand the extremities of weather to which it may be exposed. An exemplary relatively low-cost material may be carbon steel that has been provided with at least one corrosion resistant coating, such as a zinc anodization, powder coating, paint, or other suitable coating. Nevertheless, and as noted above, stainless steel and many other metals or other materials are contemplated herein.

Tongue arm 20 may comprise a solid or tubular bar stock. While the exact length of tongue arm 20 is not critical, the length will preferably be determined to satisfy two separate objectives.

The first objective is to preferably interfere with access to the ball opening in a trailer coupler, making it more difficult for a thief to engage the trailer coupler with a ball. A hitch stop 21 is provided at the end of tongue arm 20 that rises above a trailer coupler, and in combination with tongue arm 20 prevents access either above or below the trailer coupler. While hitch stop 21 may take on other suitable geometries than the three illustrated faces, most preferably hitch stop 21 will extend both above and below trailer coupler 2, and will also wrap from the leading edge of trailer coupler 2 around toward trailer tongue 1. Since hitch stop 21 does not directly engage with the opening into trailer coupler 2, the length of tongue arm 20 is not as critical. In other words, since hitch stop 21 does not have to exactly align with trailer coupler 2, there is some distance tolerance that can still accommodate some variability in the spacing between trailer coupler 2 and trailer jack 3. While hitch stop 21 is preferred, in an alternative embodiment contemplated herein, a ball may be provided in the appropriate position on and secured with tongue arm 20 to directly engage with the trailer coupler to block access from below. By interfering with access to trailer coupler 2, the trailer owner will also be forced to remove jack lock 10 prior to using the trailer, thereby preventing the trailer owner from inadvertently trying to move the trailer with preferred embodiment jack lock 10 engaged.

The second objective is to cooperatively work with both a trailer jack and with the balance of preferred embodiment jack lock 10 to prevent rotation, and if rotated, to interfere with movement of the trailer. Hitch stop 21 wraps about the trailer coupler, to thereby prevent rotation of jack lock 10 about a vertical axis defined by trailer jack 3. In the preferred embodiment, tongue arm 20 extends from the center of jack enclosure 30 by approximately the same distance that jack enclosure 30 is tall, such that if for any reason the jack is rotated about a horizontal axis, tongue arm 20 will engage with the ground and interfere with movement. As a result, preferred embodiment jack lock 10 is secured to and blocks the ball receiver and simultaneously extends about and prevents retraction of trailer jack 3, and thereby ensures that trailer jack 3 stays in contact with the ground and interferes with movement of the trailer.

Figure 4:
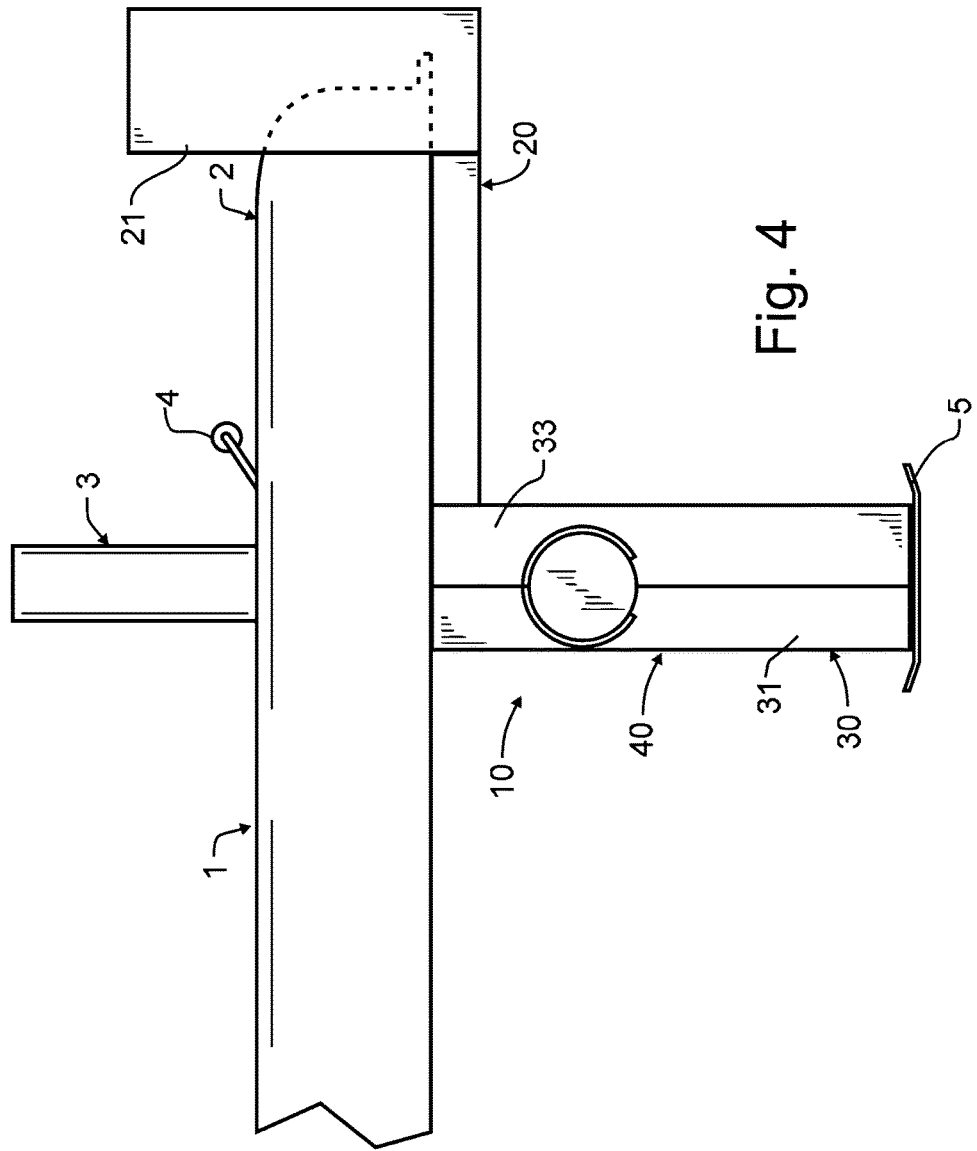
FIG. 4 illustrates the preferred embodiment jack lock of FIG. 1 in combination with a trailer tongue, trailer coupler, and jack in an active position.

In preferred embodiment jack lock 10, jack enclosure 30 has a jack enclosure portion 31 and a jack enclosure portion 33 that are coupled to each other through a hinge 35. As is apparent from FIG. 3, hinge 35 allows jack enclosure portions 31, 33 to open and close in a clamshell fashion. When closed, as illustrated in FIGS. 1, 2, and 4, jack enclosure 30 defines a generally square tube that may be open on both ends.

Securely affixed intermediate along the longitudinal length of jack enclosure 30 is lock enclosure 40 that defines an almost complete generally tubular body protruding transversely to the vertical axis defined by trailer jack 3. Lock enclosure 40 is formed from two independent arcuate, almost semi-circular, lock enclosure portions 41, 43. Lock enclosure portion 41 is solely coupled with jack enclosure portion 31, and pivots therewith in the same clamshell manner about hinge 35. Likewise, lock enclosure portion 43 is solely coupled with jack enclosure portion 33. When closed and locked, as illustrated in FIGS. 1, 2, and 4, lock enclosure 40 circumscribes puck lock 50, helping to shelter puck lock 50 from the elements while also preventing access from the top and sides. The only access is through the open side and on the bottom as illustrated, which permits access with key 55 to puck lock 50, and allows puck lock 50 to be placed as illustrated in FIG. 2 and described herein below. In a less preferred alternative embodiment, lock enclosure 40 may be reduced in side or coverage, with the obvious adverse consequences of weather and potentially easier thievery.

Within the interior of lock enclosure 40 there are most preferably two lock ears 45, 46. Lock ears 45, 46 are visible in FIGS. 2 and 3. Lock ear 45 is secured to lock enclosure portion 41, while lock ear 46 is secured to lock enclosure portion 43. Lock ear 45 has a lock hole 48, and lock ear 46 has a similar lock hole 47, each lock hole visible in FIG. 3. When lock enclosure 40 is closed, as illustrated in FIGS. 1, 2, and 4, lock hole 47 and lock hole 48 align. This permits locking pin 54 of puck lock 50 to pass through both lock holes 47, 48. When so locked, neither jack enclosure 30 nor lock enclosure 40 may be opened.

Puck lock 50 has an elevated bottom face 51 and a recessed bottom face 52 that is slightly recessed from elevated bottom face 51. When puck lock 50 is installed within lock enclosure 40, elevated bottom face 51 will make contact with jack enclosure 30. Once key 55 is turned, passing locking pin 54 through lock holes 47, 48, elevated bottom face 51 will also be secured either in direct contact with or very close to jack enclosure 30. Since locking pin recess 53 is formed in recessed bottom face 52, a would-be thief has great difficulty inserting anything into locking pin recess 53, since elevated bottom face 51 is in the way. By leaving lock enclosure portions 41 and 43 so that they define slightly less than a full circle, there remains key 55 access on the bottom side thereof to puck lock 50.

FIG. 4 illustrates preferred embodiment jack lock 10 installed and secured about a prior art trailer jack 3. As is known, a typical prior art trailer tongue 1 may include a trailer coupler 2, and a trailer jack 3 having a trailer jack handle 4 operable to extend or retract a trailer jack base 5. In the prior art, trailer jack handle 4 was operable to retract trailer jack 3 when desired, meaning that if trailer coupler 2 is supported upon a ball or other suitable support, then trailer jack base 5 could be lifted from the ground and thereby permit transport of the trailer. However, in accord with the teachings of the present invention, preferred embodiment jack lock 10 will be opened to the position illustrated in FIG. 3, and placed about trailer jack 3 when trailer jack base 5 is extended. Tongue arm 20 will be aligned or engaged with trailer coupler 2. Next, jack enclosure portion 31 carrying lock enclosure portion 41 will be pivoted about hinge 35, to thereby simultaneously close both jack enclosure 30 and lock enclosure 40. Finally, puck lock 50 is manually placed within lock enclosure 40, and key 55 is turned to cause locking pin 54 to pass through lock holes 47, 48, thereby locking trailer jack 3 and trailer jack base 5 in an extended configuration. In this position, theft of the trailer is vastly more difficult, since trailer jack base 5 will drag upon the ground, and since in the elevated position it will be difficult or impossible for the thief to bring trailer coupler 2 adjacent to a trailer ball. Furthermore, there is no benefit to a would-be thief of trying to separate trailer coupler 2 from trailer tongue 1, and in fact such separation is made vastly more difficult owing to the interference created by hitch stop 21.

As may be appreciated, a single opening and closing motion of the two jack enclosure portions 31, 33 by a simple pivot about hinge 35 allows a trailer owner to install preferred embodiment jack lock 10. This installation is extremely quick and intuitive. The puck lock is then placed in the obvious lock enclosure 40 and locked. Yet, with this quick, simple, and intuitive installation, preferred embodiment jack lock 10 is also more resistant to theft than heretofore available.

While prior art trailer jack 3 is illustrated as having a prior art base 5 that is designed for ground engagement, other known terminations of trailer jack 3 that are operable with the present invention will also be understood to be incorporated in or cooperative with the present invention. For exemplary purposes only, and not solely limiting the present invention thereto, a wheel may provided at the end of trailer jack 3 instead of base 5. Because preferred embodiment jack lock 10 does not alter or interfere with trailer jack base 5, trailer jack base 5 may still be used effectively on any surface that it otherwise would have, including but not limited to paved and earthen surfaces.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

In a first alternative embodiment of the invention illustrated in FIGS. 5-7, a jack lock 110 is comprised of a tongue arm 120, a jack enclosure 130, and a lock enclosure 140. A hitch stop 121 is provided at the end of tongue arm 120 that rises above a trailer coupler, and in combination with tongue arm 120 prevents access either above or below the trailer coupler.

Jack enclosure 130 has a jack enclosure portion 131 and a jack enclosure portion 133 that are coupled to each other through a hinge 135. As is apparent from FIGS. 6 and 7, hinge 135 allows jack enclosure portions 131, 133 to open and close in a clamshell fashion. When closed, as illustrated in FIGS. 5, 6, and 8, jack enclosure 130 defines a generally square tube that may be open on both ends.

Securely affixed intermediate along the longitudinal length of jack enclosure 130 is lock enclosure 140, which has a lock enclosure portion 141 and a lock enclosure portion 143. Lock enclosure portion 141 is solely coupled with jack enclosure portion 131, and pivots therewith in the same clamshell manner about hinge 135. Likewise, lock enclosure portion 143 is solely coupled with jack enclosure portion 133. When closed, as illustrated in FIGS. 5, 6, and 8, lock enclosure 140 defines a generally square tube shorter than jack enclosure 130. Lock enclosure portion 141 and lock enclosure portion 143 prevent access from the sides, while a lock enclosure top cover 142 prevents access from the top. The only access to the interior is through the opening on the bottom side as illustrated, though in an alternative embodiment lock enclosure 140 may be open on both the top and bottom ends.

Within the interior of lock enclosure 140 there are most preferably two lock bars 145, 146. Lock bar 145 is secured to lock enclosure portion 141, while lock bar 146 is secured to lock enclosure portion 143. Lock bar 145 has a lock hole 148 distal to the connection to lock enclosure portion 141, and lock bar 146 has a similar lock hole 147 distal to the connection to lock enclosure portion 143. When lock enclosure 140 is closed, as illustrated in FIGS. 5, 6, and 8, lock hole 147 and lock hole 148 align. This permits a lock of any suitable sort, such as for exemplary purposes only and not solely limiting the invention thereto, a padlock, to pass through both lock holes 147, 148. When so locked, neither jack enclosure 130 nor lock enclosure 140 may be opened.

FIG. 8 illustrates first alternative embodiment jack lock 110 installed and secured about a prior art trailer jack 3. In accord with the teachings of the present invention, preferred embodiment jack lock 110 will be opened to the position illustrated in FIG. 7, and placed about trailer jack 3 when trailer jack base 5 is extended. Tongue arm 120 will be aligned or engaged with trailer coupler 2. Next, jack enclosure portion 131 carrying lock enclosure portion 141 will be pivoted about hinge 135, to thereby simultaneously close both jack enclosure 130 and lock enclosure 140. Finally, a padlock or other suitable equivalent is manually placed and secured through lock holes 147, 148, thereby locking trailer jack 3 and trailer jack base 5 in an extended configuration. In this position, theft of the trailer is vastly more difficult, since trailer jack base 5 will drag upon the ground, and since in the elevated position it will be difficult or impossible for the thief to bring trailer coupler 2 adjacent to a trailer ball.

While prior art trailer jack 3 is illustrated as having a prior art base 5 that is designed for ground engagement, other known terminations of trailer jack 3 that are operable with the present invention will also be understood to be incorporated in or cooperative with the present invention. For exemplary purposes only, and not solely limiting the present invention thereto, a wheel may provided at the end of trailer jack 3 instead of base 5.

While jack enclosure 130 is preferably fabricated from a solid material such as sheet stock, lock enclosure portions 141, 142, 143 may in an alternative embodiment may be fabricated from a perforated material such as expanded metal or the like. While solid material provides a greater theft deterrent and better weather shelter, the use of a perforated material allows somewhat simpler installation of a lock.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a trailer and jack lock,
   said trailer comprising:
      a trailer body configured to transport cargo;
      a trailer coupler adapted to couple to a land vehicle;
      a tongue secured on a first end to said trailer coupler and on a second end distal to said first end to said trailer body; and
      a jack having a retractable base;
   said jack lock comprising:
      a jack enclosure selectively configured in a first restraining position to prevent said jack retractable base from retracting to an inoperative position, and in a second releasing position to permit said jack lock to be removed from said jack;
      a tongue arm secured on a first end with said jack enclosure;
      a hitch stop secured on a second end of said tongue arm distal to said jack enclosure and configured to block said land vehicle from accessing said trailer coupler when said jack enclosure is in said first restraining position; and a lock selectively configured in a first locked position to hold said jack enclosure in said first restraining position and in a second unlocked position to permit said jack enclosure to be moved from said first restraining position to said second releasing position.

2. The combination trailer and jack lock of claim 1, wherein said jack enclosure further comprises:
   a first jack enclosure portion;
   a second jack enclosure portion; and
   a hinge coupling said first jack enclosure portion to said second jack enclosure portion and allowing said first jack enclosure portion and said second jack enclosure portion in said first restraining position to abut each other and define a generally tubular geometry, and allowing said first jack enclosure portion and said second jack enclosure portion in a second position to spread apart and define a generally open clamshell geometry.

3. The combination trailer and jack lock of claim 2, further comprising a lock enclosure protruding from said jack enclosure and configured to limit access to said lock when said lock is in said first locked position.

4. The combination trailer and jack lock of claim 3, wherein said lock enclosure further comprises:
   a first lock enclosure portion affixed to said first jack enclosure portion;
   a second lock enclosure portion affixed to said second jack enclosure portion and pivotal therewith about said hinge with respect to said first lock enclosure and said first jack enclosure.

5. The combination trailer and jack lock of claim 4, wherein said first and second lock enclosure portions each further comprises a lock ear having a hole therein, said first and second lock ear holes aligned when said jack enclosure is in said first restraining position.

6. The combination trailer and jack lock of claim 5, wherein said lock further comprises a puck lock having a bottom face immediately adjacent to said jack enclosure when said lock is in said first locked position, and a locking pin passing through said aligned first and second lock ear holes when said lock is in said first locked position and said jack enclosure is in said first restraining position.

7. The combination trailer and jack lock of claim 6, wherein said puck lock further comprises:
   a recessed bottom face on an edge adjacent to said bottom face and having a small gap between said recessed bottom face and said jack enclosure;
   a locking pin recess formed in said recessed bottom face; and
   a locking pin selectively bridging said locking pin recess when said lock is in said first locked position and retracting at least to only partially bridging said locking pin recess when said lock is in said second unlocked position.

8. The combination trailer and jack lock of claim 5, wherein said lock further comprises a padlock having a shackle passing through said aligned first and second lock ear holes when said padlock is in said first locked position and said jack enclosure is in said first restraining position.

9. A jack lock configured to lock a trailer coupler and trailer jack and thereby deter theft of a trailer, said jack lock comprising:
   a jack enclosure having a first jack enclosure portion, a second jack enclosure portion, and a hinge coupling said first jack enclosure portion to said second jack enclosure portion, said hinge adapted in a first restraining position to allow said first jack enclosure portion and said second jack enclosure portion to abut each other and define a generally tubular geometry that prevents a jack retractable base from retracting to an inoperative position, and adapted in a second releasing position to allow said first jack enclosure portion and said second jack enclosure portion to spread apart and define a generally open clamshell geometry selectively configured to permit said jack lock to be removed from said trailer jack;
   a tongue arm secured on a first end with said jack enclosure and extending longitudinally therefrom in a direction generally transverse to a longitudinal axis of said jack enclosure;
   a hitch stop secured on a second end of said tongue arm distal to said jack enclosure and configured to block a land vehicle from accessing said trailer coupler when said jack enclosure is in said first restraining position; and
   a lock selectively configured in a first locked position to hold said jack enclosure in said first restraining position and in a second unlocked position to permit said jack enclosure to be moved from said first restraining position to said second releasing position.

10. The jack lock of claim 9, wherein said hitch stop further comprises three faces, a first face transverse to said tongue arm, and second and third faces angled with respect to first face and at least partially wrapping toward said jack enclosure.

11. The jack lock of claim 9, wherein said hitch stop further extends vertically from said tongue arm.

12. The jack lock of claim 9, further comprising a lock enclosure protruding from said jack enclosure and configured to limit access to said lock when said lock is in said first locked position.

13. The jack lock of claim 12, wherein said lock enclosure further comprises:
   a first lock enclosure portion affixed to said first jack enclosure portion;
   a second lock enclosure portion affixed to said second jack enclosure portion and pivotal therewith about said hinge with respect to said first lock enclosure and said first jack enclosure.

14. The jack lock of claim 13, wherein said first and second lock enclosure portions each further comprises a lock ear having a hole therein, said first and second lock ear holes aligned when said jack enclosure is in said first restraining position.

15. The jack lock of claim 14, wherein said lock further comprises a puck lock having a bottom face immediately adjacent to said jack enclosure when said lock is in said first locked position, and a locking pin passing through said aligned first and second lock ear holes when said lock is in said first locked position and said jack enclosure is in said first restraining position.

16. The jack lock of claim 15, wherein said puck lock further comprises:
   a recessed bottom face on an edge adjacent to said bottom face and having a small gap between said recessed bottom face and said jack enclosure;
   a locking pin recess formed in said recessed bottom face; and
   a locking pin selectively bridging said locking pin recess when said lock is in said first locked position and retracting at least to only partially bridging said locking pin recess when said lock is in said second unlocked position.

17. The jack lock of claim 14, wherein said lock further comprises a padlock having a shackle passing through said aligned first and second lock ear holes when said padlock is in said first locked position and said jack enclosure is in said first restraining position.

18. A jack lock, comprising:
- a jack enclosure having a first jack enclosure portion, a second jack enclosure portion, and a hinge coupling said first jack enclosure portion to said second jack enclosure portion, said hinge adapted in a first restraining position to allow said first jack enclosure portion and said second jack enclosure portion to abut each other and define a generally tubular geometry that is configured to prevent a jack retractable base from retracting to an inoperative position, and adapted in a second releasing position to allow said first jack enclosure portion and said second jack enclosure portion to spread apart and define a generally open clamshell geometry selectively configured to permit said jack lock to be removed from a trailer jack;
- a tongue arm secured on a first end with said jack enclosure and extending longitudinally therefrom in a direction generally transverse to a longitudinal axis of said jack enclosure, said tongue arm length comparable to said jack enclosure length and thereby adapted to engage with a ground surface if said jack lock is rotated about a horizontal axis;
- a hitch stop secured on and extending vertically from a second end of said tongue arm distal to said jack enclosure and having a first face transverse to said tongue arm, and second and third faces angled with respect to first face and at least partially wrapping toward said jack enclosure and thereby configured to block a land vehicle from accessing a trailer coupler when said jack enclosure is in said first restraining position;
- a lock selectively configured in a first locked position to hold said jack enclosure in said first restraining position and in a second unlocked position to permit said jack enclosure to be moved from said first restraining position to said second releasing position; and
- a lock enclosure having a first lock enclosure portion affixed to said first jack enclosure portion and a second lock enclosure portion affixed to said second jack enclosure portion and pivotal therewith about said hinge with respect to said first lock enclosure and said first jack enclosure, said lock enclosure protruding generally transversely from said jack enclosure and configured to limit access to said lock when said lock is in said first locked position.

19. The jack lock of claim 18, wherein said first and second jack enclosure portions each further comprises a lock ear having a hole therein, said first and second lock ear holes aligned when said jack enclosure is in said first restraining position; and wherein said lock further comprises a puck lock having a bottom face immediately adjacent to said jack enclosure when said lock is in said first locked position, and a locking pin passing through said aligned first and second lock ear holes when said lock is in said first locked position and said jack enclosure is in said first restraining position; said puck lock further comprising:
- a recessed bottom face on an edge adjacent to said bottom face and having a small gap between said recessed bottom face and said jack enclosure;
- a locking pin recess formed in said recessed bottom face; and
- a locking pin selectively bridging said locking pin recess when said lock is in said first locked position and retracting at least to only partially bridging said locking pin recess when said lock is in said second unlocked position.

20. The jack lock of claim 19, wherein said first and second jack enclosure portions each further comprises a lock ear having a hole therein, said first and second lock ear holes aligned when said jack enclosure is in said first restraining position; and wherein said lock further comprises a padlock having a shackle passing through said aligned first and second lock ear holes when said padlock is in said first locked position and said jack enclosure is in said first restraining position.

* * * * *